United States Patent [19]

Bouhennicha et al.

[11] Patent Number: 5,387,080
[45] Date of Patent: Feb. 7, 1995

[54] ROTATIONALLY GUIDED CONTROL RING FOR PIVOTABLE VANES IN A TURBOMACHINE

[75] Inventors: Yassin Bouhennicha, Corbeil; Daniel J. Marey, Soisy sur Seine, both of France

[73] Assignee: Societe Nationale d'Etude et de Construction de Moteurs d'Aviation "SNECMA", Paris, France

[21] Appl. No.: 171,699

[22] Filed: Dec. 22, 1993

[30] Foreign Application Priority Data

Dec. 23, 1992 [FR] France .................. 92 15539

[51] Int. Cl.⁶ ............................................ F04D 29/60
[52] U.S. Cl. .................................... 415/150; 415/162
[58] Field of Search .............. 415/173.2, 174.1, 148, 415/150, 160, 162, 166

[56] References Cited

U.S. PATENT DOCUMENTS

| 2,924,375 | 2/1960 | McKissock ............... 415/150 |
| 2,940,784 | 6/1960 | Fell . |
| 3,356,288 | 12/1967 | Corsmeier . |
| 3,496,628 | 2/1970 | Davis ................... 415/148 |
| 4,498,625 | 2/1985 | Schechter . |
| 4,925,364 | 3/1990 | Das .................... 415/150 |
| 5,096,375 | 3/1992 | Ciokailo ............... 415/173.2 |

FOREIGN PATENT DOCUMENTS

| 0375593 | 6/1990 | European Pat. Off. . |
| 2672083 | 7/1992 | France . |
| 2206381 | 1/1989 | United Kingdom . |

Primary Examiner—John T. Kwon
Attorney, Agent, or Firm—Oblon, Spivak, McClelland, Maier & Neustadt

[57] ABSTRACT

A control ring for a stage of pivotable vanes on the stator of a turbomachine carries a plurality of adjustable shoes for contacting a circular surface to set and maintain the coaxiality of the control ring during rotation thereof to pivot the vanes. The radial position of each shoe is adjusted by virtue of a double screw having two screw-threaded portions, one engaging with an internally threaded portion of a bush fixed to the control ring and the other engaging with an internally threaded portion of a shoe-holder which is mounted slidably and non-rotatably in the bush, the two screw-threaded portions having slightly different pitches so as to permit very fine adjustment of the shoe postion.

7 Claims, 2 Drawing Sheets

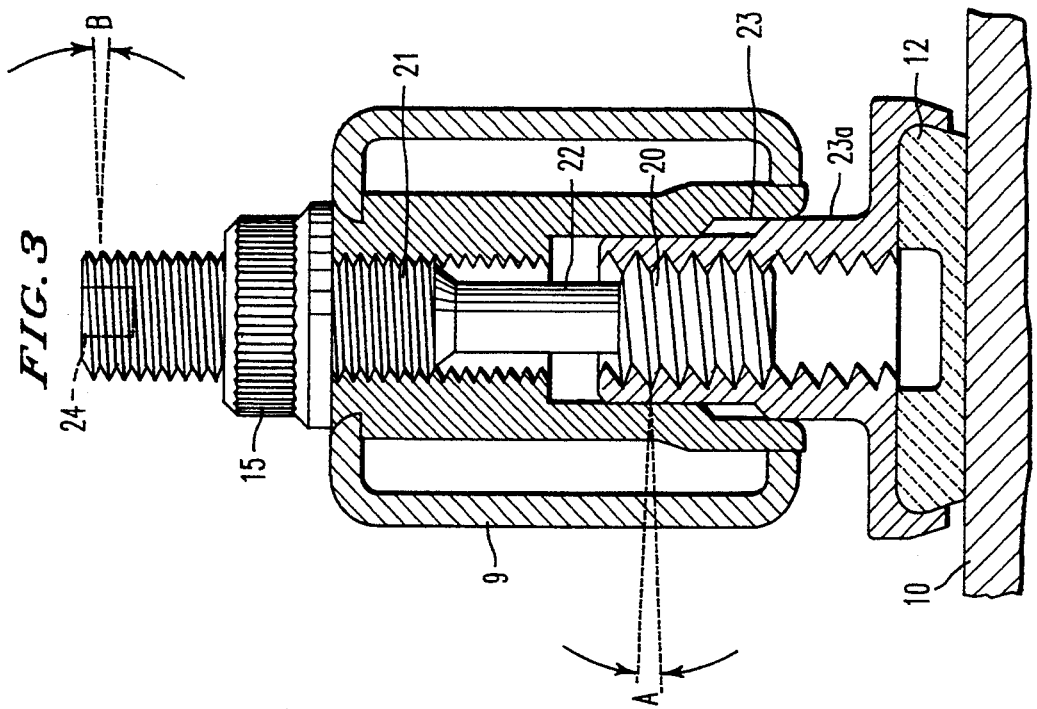
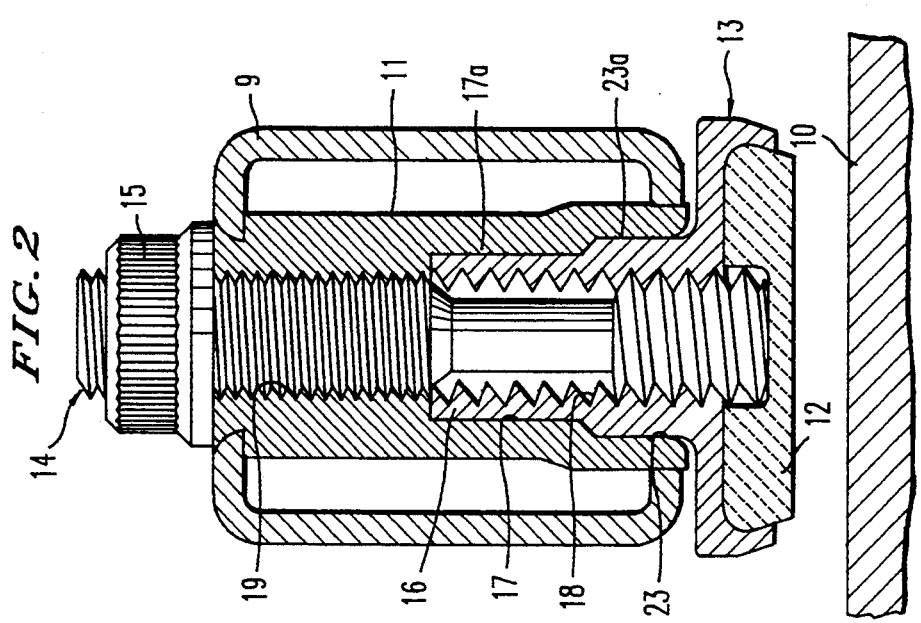

5,387,080

ROTATIONALLY GUIDED CONTROL RING FOR PIVOTABLE VANES IN A TURBOMACHINE

BACKGROUND OF THE INVENTION

1. Field of the Invention

The invention relates to a control ring for a stage of pivotable vanes in a turbomachine and means for guiding the ring during rotation of the ring to pivot the vanes.

Modern turbomachines often include stator vanes which can pivot around axles connecting them to the stator so that their so-called pitch angle may be adjusted in order to maintain satisfactory gas flow characteristics in all operating regimes of the machine. The pivot axles of the vanes are connected to links which are pivotally connected at their other end to a common ring, and rotation of the ring causes pivoting of the links, and hence the axles and the vanes.

2. Summary of the Prior Art

Research aimed at improving the efficiency of turbomachines has led also to improving the precision of the pitch angle of the vanes. To achieve this, it is necessary to ensure excellent coaxiality between the ring and a circular surface of the machine, such as the stator casing. For this purpose the ring is provided with shoes which are connected to the ring by mounting means so that they surround reference surfaces with a very small clearance, the mounting means permitting adjustment of the shoes in a radial direction.

An example of such an arrangement is disclosed in European Patent 0 375 593, wherein the mounting means for each shoe comprises a threaded bush crimped through the ring, and a shoe-holder having a guide rod which is slidable without rotation in a hole of non-circular section so as to enable the shoe to slide without being able to rotate. The shoe-holder is completed by a threaded rod which passes right through the ring, and a threaded sleeve is disposed around the rod by screwing the sleeve into the bush. The rotation of the sleeve in the bush determines the position of the shoe by pushing back the guide rod, and a lock-nut may be engaged with the thread of the rod protruding from the ring to compress the sleeve against the guide section.

It is an object of the invention to provide the ring with shoe mounting means which allow much finer setting of the radial positions of the shoes than the known arrangement described above.

SUMMARY OF THE INVENTION

According to the invention there is provided a control ring for a stage of pivotable vanes in a turbomachine, said control ring carrying a plurality of shoes for contacting arcuate reference surfaces on said turbomachine to guide rotation of said control ring, and respective mounting means adjustably mounting said shoes on said control ring, each of said mounting means comprising a bush rigidly connected to said control ring, means defining a passage through said bush, said passage having an internally screw-threaded first portion and a second portion, a shoe holder to which the respective shoe is securely fixed, a rod on said shoe holder received slidably and non-rotatably in said second portion of said passage, an internally screw-threaded bore in said rod axially aligned with said first portion of said passage, and a double screw having first and second screw-threaded portions, said first screw-threaded portion of said double screw engaging and cooperating with said internally screw-threaded first portion of said passage, and said second screw-threaded portion of said double screw engaging and cooperating with said internally screw-threaded bore of said rod, the pitch of said first screw-threaded portion being close to the pitch of said second screw-threaded portion.

Preferably the ratio of the pitches of the first and second screw-threaded portions of the double screw is between ⅔ and 3/2.

The closer are the pitches of the first and second screw-threaded portions of the double screw, the smaller is the translational movement of the shoe-holder relative to the ring for a given rotation of the screw.

The utilization of the double male screw in each shoe mounting means of the control ring in accordance with the invention is advantageous because, in addition to enabling fine setting of the shoe position to be achieved, it permits the outer surface of the shoe-holder rod to be used for precise rotationless sliding within the bush which is rigidly connected to the control ring.

A more compact system is obtained with the hole of non-circular cross-section belonging to the bush.

To aid further understanding of the invention a preferred embodiment will now be described, by way of example only, with reference to the accompanying drawings.

BRIEF DESCRIPTION OF THE DRAWINGS

FIG. 2 is a sectional view of one of the shoe mounting devices of the control ring, showing the shoe in an extreme adjustment position spaced from the reference surface; and, FIG. 3 is a view similar to FIG. 2, but showing the device with the shoe adjusted to a postion contacting the reference surface.

DESCRIPTION OF THE PREFERRED EMBODIMENT

Figure 1:
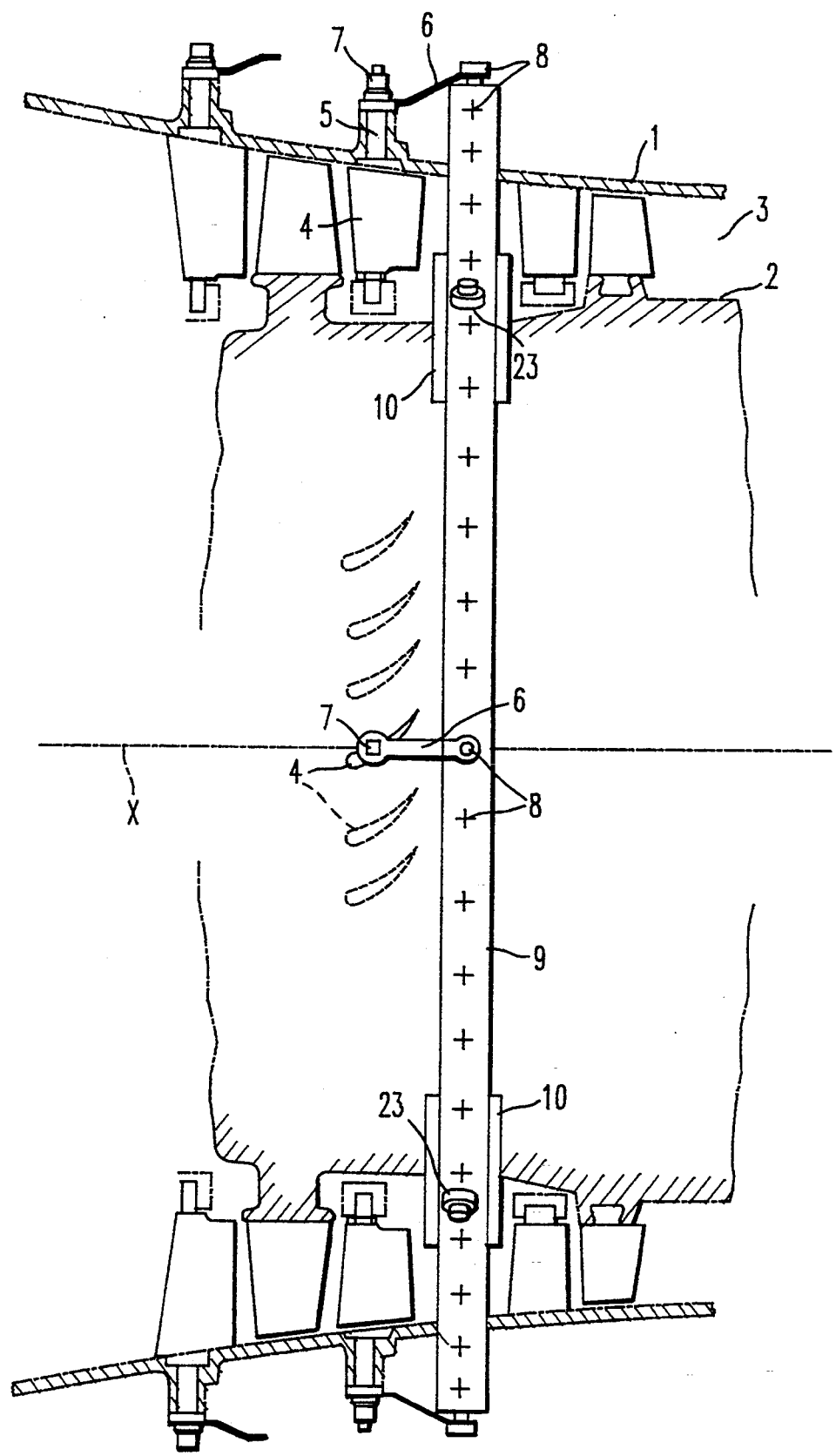
FIG. 1 is a diagrammatic view showing the control ring in accordance with the invention mounted on a turbomachine for pivoting a stage of pivotable stator vanes.

FIG. 1 shows diagrammatically a portion of a stator casing 1 which surrounds a rotor 2 with a space therebetween which forms an annular gas flow path 3 in the direction of the axis x of the machine and in which stages of stator vanes alternate with stages of rotor blades. The vanes 4 of some of the stator stages are pivotable, each having a pivot axle 5 passing through the casing 1 and connected at its outer end to a link 6 by means of a square end piece 7. The other end of each link 6 is pivotally connected to a respective pivot 8 disposed radially on a control ring 9 which surrounds the casing 1. The control ring 9 must be coaxial with the axis x and for this purpose is provided with mounting means carrying radially adjustable shoes (as described below) for contacting a circular reference surface 10 mounted on the casing 1 and centred on the axis x. Rotation of the control ring 9 (by means not shown) acts through the links 6 to pivot the vanes 4, the coaxiality of the ring with the axis x being maintained during rotation by guidance of the shoes on the reference surface 10.

Since the displacement of the vane control ring 9 is short, the reference surface 10 does not need to be continuous and may be provided by a number of separate sectors having outer surfaces centred on the axis x, each sector being arranged to be contacted by at least one shoe. While the arcuate sectors are of course coaxial with the ring, they may if necessary be situated at slightly different distances from the axis.

The mounting means used consists of several devices 9 (at least three) constructed as shown in FIGS. 2 and 3, each device comprising a bush 11 crimped securely in the control ring 9 and which extends radially through it, a shoe 12 fixed to a shoe-holder 13 mounted in the bush 11 and facing towards the reference surface 10, a double male screw 14 cooperating with the bush and the shoe-holder, and a locknut 15.

The bush 11 has a passage which extends right through it in a direction perpendicular to the reference surface 10. This passage has, in succession from its outer end to its inner end, an internally screw-threaded first portion 19, a second portion 17 with a non-circular section, and a third portion 23 with a preferably circular section.

The shoe-holder 13 has at its end opposite the shoe 12 a rod 16 which is slidable non rotatably in the passage of the bush 11. The rod 16 is hollow and has an internal screw-thread 18. The portion of the rod 16 further from the shoe 12 has a section 17A complementary to the non-circular section of the second portion 17 of the passage through the bush 11, and thus forms with it a close fit. The portion of the rod 16 nearer the shoe 12 has a section 23A complementary to the section of the third portion of the passage through the bush 11 and forms with it a close fit with a small clearance. The sections 23 and 23A are preferably circular to facilitate the achievement of a fitting with small clearance. The sections 17—17A and 23—23A each extend over a length greater than the normal adjustment range of the shoe 12.

The role of the sections 17—17A is to guide the translational movement of the shoe-holder 13 in the bush 11 and ensure its non-rotation. The role of the sections 23—23A is to improve the translational guidance of the shoe-holder 13 in the bush 11 and to keep a better hold on the shoe 12 when the latter moves on the reference surface 10 during rotation of the control ring 9 to adjust the pitch angle of the vanes. This last function improves the operation of the device but is not indispensable.

The double screw 14 is formed with two male threads 20 and 21 separated by a narrower shank 22 and respectively engaging with the internal screw-thread 18 of the rod 16 and the internal screw-thread 19 of the bush 11. The end of the screw 14 remote from the shoe 12 is located outside the control ring 9 and has a head 24 which is arranged to be gripped by a tool for rotating the screw. the thread of the screw 21 extends as far as the head 24, and the locknut 15 is screwed on it. The locknut is preferably of the "washer faced" type and, in operation, bears on the bush 11, which is fixed and rigidly connected to the control ring 9. The threads 20 and 21 are of the same hand but have helix angles which are slightly different (i.e. they have slightly differing pitches). If, for example, the pitch angle A of the thread 20 is greater by 25% than that (B) of the thread 21, and if these threads are of the same hand, it will be observed that a rotation of the double screw 14 would bring about a translation of the shoe-holder 13 and the shoe 12 relative to the control ring 9 four times smaller than the translation of the double screw 14 itself. The clearance between the shoe 12 and the reference surface 10 can then be set with the greatest care to obtain an excellent coaxiality of the control ring 9. It will be appreciated that this differential translation effect can be obtained only by means of the non-rotatable sliding fit of the shoe-holder 13 in the bush 11, whereas the equivalent arrangement in the prior patent mentioned earlier is aimed only at preventing the rotation of the shoe.

Other advantages of the invention resulting from the central position of the double male screw 14 are as follows:

- the screw 14 may have a small diameter and provide a substantial reduction in the translational movement of the shoe with threads having a normal pitch/diameter ratio, such a screw 14 therefore being relatively strong and suffering little risk of jamming;

- the locknut 5 bears on the bush 11, which is fixed, thus reducing the risk of altering the setting of the shoe during tightening of the locknut, which is not the case in the earlier mentioned prior patent where the nut bears on the setting screw and can cause rotation of the latter during tightening.

I claim:

1. A control ring for a stage of pivotable vanes in a turbomachine, said control ring carrying a plurality of shoes for contacting arcuate reference surfaces on said turbomachine to guide rotation of said control ring, and respective mounting means adjustably mounting said shoes on said control ring, each of said mounting means comprising a bush rigidly connected to said control ring, means defining a passage through said bush, said passage having an internally screw-threaded first portion and a second portion, a shoe holder to which the respective shoe is securely fixed, a rod on said shoe holder received slidably and non-rotatably in said second portion of said passage, an internally screw-threaded bore in said rod axially aligned with said first portion of said passage, and a double screw having first and second screw-threaded portions, said first screw-threaded portion of said double screw engaging and cooperating with said internally screw-threaded first portion of said passage, and said second screw-threaded portion of said double screw engaging and cooperating with said internally screw-threaded bore of said rod, the pitch of said first screw-threaded portion being close to the pitch of said second screw-threaded portion.

2. A control ring according to claim 1, wherein said second portion .of said passage and said rod have corresponding non-circular cross-sections over a length greater than a normal adjustment range of said shoe.

3. A control ring according to claim 2, wherein said non-circular cross-section of said rod is situated on a part of said rod remote from said shoe.

4. A control ring according to claim 2, wherein said second portion of said passage and said rod also have circular cross-sections over a length greater than said normal adjustment range of said shoe, said circular cross-sections being gauged to provide a small clearance.

5. A control ring according to claim 4, wherein said circular cross-section of said second portion of said passage, in use, is nearer the respective reference surface than said non-circular cross-section of said second portion, and said circular cross-section of said rod is situated on a part of said rod near said shoe.

6. A control ring according to claim 1, wherein each of said mounting means further comprises a locknut engaged with said first screw-threaded portion of said double screw and arranged to bear on said bush.

7. A control ring according to claim 1, wherein the ratio of the pitches of said first and second screw-threaded portions of said double screw is between ⅔ and 3/2.

* * * * *